May 23, 1961 E. L. PEATROSS 2,985,183
AUTOMATICALLY VARIABLE GAIN CONTROLLER
Filed Nov. 29, 1957 3 Sheets-Sheet 2

INVENTOR.
EDWIN L. PEATROSS
BY P. J. Young, Jr.

United States Patent Office 2,985,183
Patented May 23, 1961

2,985,183

AUTOMATICALLY VARIABLE GAIN CONTROLLER

Edwin L. Peatross, Glendale, Calif., assignor to Taylor Instrument Companies, Rochester, N.Y., a corporation of New York Filed Nov. 29, 1957, Ser. No. 699,730

15 Claims. (Cl. 137—86)

This application relates to characterized control systems, and one object of the invention is to provide a controller with which characterized control may be carried out without a certain drawback inherent in prior art characterized control systems.

A further object of the invention is to provide a controller which may readily be utilized either as a linear controller or as a characterizing controller by removing from or adding to the controller a very simple accessory.

These and further objects of the invention will be evident from the disclosure to follow.

In the control of processes, the quality of control is often evaluated in terms of how the process is established in a given state of activity by the controller. If the job of the controller is to affect the process so as to cause one or another process condition to maintain some predetermined value, one common criterion of control quality is, generally speaking, whether or not a process disturbance responded to by the controller results in a certain type of oscillation of the said condition about the desired value with the amplitude of oscillation decaying at a given rate. If so, the control is thought to be optimal insofar as speed, accuracy and stability is concerned.

However, in processes involving the control of fluid flow, it is not always possible to achieve conformance to the just-described criterion, because of non-linearity in process behavior. While there are a number of ways in which non-linearity may arise, the net effect is that what appears to the controller as a change in process demand for flow is answered by the control valve with a change in flow inconsistent with the supposed change in demand. This phenomenon is variously referred to as variable gain or sensitivity of the system or of some part of the system including process, controller and valve.

Even though the elements of the system, i.e., valve, controller, etc., apparatus, can be constructed so that each has nominally a constant gain or sensitivity of itself, process conditions can cause non-linear behavior of the system. For example, a beveled disk valve can readily be constructed so that its sensitivity, i.e., ratio of percent of total opening to percent of total lift, elevation or movement of disk, is constant for most practical purposes, in certain classes of processes.

This is not the case when the flow through the valve is a function of the pressure or head drop across the valve. In such processes, it is found that if the valve is moved over a substantial proportion of its range of flow-varying capability, due to change in drop across the valve, the gain of the system will be too high at one extremity of said proportion of the valve range, too low at the other end, and correct for a small interval intermediate the extremities. For a more detailed disclosure of the matters involved here, see the article "Valve Characteristics and Process Control" by J. G. Ziegler and N. B. Nichols, Instruments, vol. 22, No. 1 (January 1949) pages 75–81.

In a particular case, flow of a compressible fluid is involved and the ratio of the valve inlet pressure to the process pressure is sufficiently large, approximately two to one, so that flow is independent of down stream pressure, and proportional to the first power of the up stream pressure instead of to a square root function involving both up stream and down stream pressure. With an otherwise supposedly linear system, the system gain will be constant or variable depending on whether or not the up stream pressure varies in a certain fashion.

The foregoing cases are purely exemplary of systems involving flow control and are not intended as an exhaustive catalog of conditions giving rise to non-linearity in systems involving the control of flow.

In any event, it may be necessary to compensate for process gain or sensitivity variation if optimum control in terms of stability, speed and accuracy is to be obtained.

Compensation for the variable gain of the process is termed "characterization" and is a matter of introducing a compensatory variable gain or sensitivity into the system.

The characterizing effect may be obtained by shaping the valve trim, as in the various types of plug valves, so that fixed increments in stem movement result, not in like increments of flow, but in flow increments that vary as a function of the extent to which the valve is open, as is well known in the art.

It is also known to automatically vary the gain of the controller as a function of the non-linearity to be compensated for, which comes down to making controller gain vary with the position of the valve stem or with the extent to which the valve is open. With this approach, undesirable features such as cams, special valve trim such as shaped plugs, non-linear stem operators, etc., can be eliminated.

In applying the latter approach to characterization of a process, I have utilized the reset signal of a multi-response controller to drive the gain adjusting mechanism, and have discovered that not only is the desired characterization thereby achieved, but also an inherent defect of all types of prior art characterization systems is thereby substantially cured. This defect is simply that not all disturbances in a characterized system should result in a change of system gain.

For example, suppose that the controller is holding the valve in a position at which it holds the process in some desired state of operation, that this state will endure for some time and that a transient change occurs in the process condition which the controller takes as a change in the flow demand of the process. If the system is a linear one operating at a fixed gain suitable for the valve position, corresponding to the desired state of the process the valve will not be moved to a new enduring positon but will merely be moved around a bit, such as to cause the process condition to execute a few damped oscillations centered about the control point (about the value maintained by the valve before the transient occurred) until the valve is restored to its old position when the transient has disappeared. However, if the system has been characterized according to one or another of the various prior art approaches, the system would respond to the transient with a change in gain, the sense of which depends on the sense of the deviation of the process condition which the controller responded to. Obviously, the controller, due to system gain variation will cause the process condition to cycle asymmetrically about the desired value, overshooting too little on one side of the control point and overshooting too much on the other side of the control point, the result being that recovery of the original control point will take longer and with more net deviation of the process from its control point, than it would in the case of an uncharacterized system.

In general, the larger the amplitude of the transient, the more exaggerated is the asymmetrical effect of prior art characterization.

The virtue of utilizing the controller reset signal is that the time delay inherent in the reset action enables the controller to distinguish, so to speak, between transient and enduring process disturbances. As is well known in the art, the reset signal is simply the output signal of the controller fed back to the controller after a time delay so as to cause the output of the controller to be a function of the duration of process deviation as well as of its magnitude.

Hence, while the controller changes its output signal when it sees a transient disturbance, the reset delay momentarily prevents output signal change from being reflected by a controller gain change, and during that time the transient gets a chance to disappear before a controller gain change results. In other words, delaying the output signal to derive a reset signal, involves damping the output signal. Accordingly, the process, insofar as are concerned transients, behaves as if it were not characterized but rather as that type of process where the demands on the control system permit the use of a linear valve and a fixed gain controller. On the other hand, a change in controller output, if sustained, does result in gain change. Insofar as the function of characterization is concerned, the delay in gain change does not prevent the gain from being sufficiently close to the desired value at all times.

While the foregoing is a more or less complete if brief description of my invention and its context, hereinbelow are set forth several specific applications of my invention for the purpose of indicating the utility of my invention in two apparently quite different cases of non-linear processes, and showing how the principle of the invention may be incorporated in various controller structures.

Figure 1:
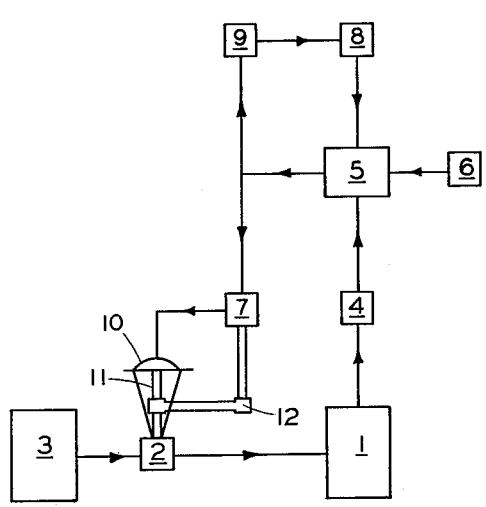
Figures 1 and 2 are schematic diagrams of two different types of processes to which my invention applies.

In Fig. 1, the boxes in the order of their numbering are: process, flow control valve, supply or source, process condition measuring device, controller, control point setting device, valve positioner, gain control and delay means.

For the most part the content of Fig. 1 is conventional, i.e., process 1 consumes flow of fluid as admitted thereto by valve 2 from supply 3. The measuring device 4 measures some process condition as an index of the process demand for fluid and transmits the measurement to controller 5. Controller 5 compares the measurement to a reference or set point signal established by control point setting device 6, which reference signal by its value corresponds to some desired mode of operation or behavior of the process. The controller 5 produces an output determined in part by the set point device 6 and in part by deviation of the reference signal and a signal representative of the measurement of the process condition from some given relation with each other.

The output of the controller is transmitted to valve positioner 7 which positions valve 2 as a function of controller output. Valve 2 includes a motor 10 energized by the output of the valve positioner to move stem 11 up or down to different positions thus moving a plug, disc, gate, or some such element of valve trim (not shown) so as to vary the opening in the valve. Usually, the valve positioner utilizes the stem motion as feedback, say, via linkage 12 in order to efficiently and accurately position the valve. In some cases, positioner 7 may be omitted, and the valve operated directly by controller output, as is well known.

As thus far described, Fig. 1 represents the essence of a number of processes involving the control of flow by a control system utilizing one or several of various types of energy such as mechanical, hydraulic, pneumatic and electrical energies to carry out control functions. While Fig. 1 shows the directions, origins and destinations of various energy flows by arrow-headed interconnections of elements, it is unnecessary to represent the auxiliary energy source such as would be used by the controller 5 and positioner 7, and perhaps by control point setting device 6 and measuring device 4.

Fig. 1 distinguishes from the prior art, however, in feeding back controller output through a delay device 9 to gain control 8. In certain cases the interconnection between boxes 9 and 8 may represent the only unconventionality of Fig. 1, since delay 9 may represent the fluid or electrical impedance of reset elements of the controller, and gain control 8 may be the usual manually-set gain control of the controller modified only to the extent of being responsive to the controller output, or equivalent, delayedly transmitted to the gain control via the reset impedance.

As it happens, Fig. 1 is also representative of several alternative schemes which I consider within the purview of my invention. For example, suppose controller 5 is such case impedance 9 represents a delay device having a proportional type controller without reset action. In no other function than to delay the feed back of the proportional output to the controller.

Again consider box 5 to incorporate therein all the elements of a controller having proportional plus reset responses (and, indifferently, rate action). In such cases, delay 9 again represents a delay device 9, entirely distinct from any impedance in the controller provided for reset functions, etc.

Still further, a valve stem position transmitting device could be utilized to operate the gain control 8 after delayed transmission thereto via impedance 9.

Obviously, if the impedance 9 is an additional element, and not some conventional element of the controller such as its reset impedance, if any, impedance 9 may be made manually-adjustable so as to permit use of gain-change delay times other than that imposed by the setting of a reset impedance. A separate impedance would be advantageous where the desired reset action of the controller involved a time delay different from the desired time delay in gain change.

Whatever operates the controller gain adjustment, the gain should substantially correspond to valve position, yet there must also be a delay between the time the valve position changes and the time at which controller gain changes to suit a new valve position.

While Fig. 1 does not indicate the exact nature of the non-linear effect to be compensated for by varying controller gain, nor is it necessary in practice to inquire into the question beyond determining the approximate variable gain effect insofar as it is reflected in the process, for the sake of illustration suppose that Fig. 1 is the schematic of a blow-down wind tunnel installation. In this process, box 3 would represent a reservoir pumped up to some extreme pressure, and box 1 the tunnel plumbing, which exhausts to some substantially fixed pressure level such as the atmosphere.

Figure 6:
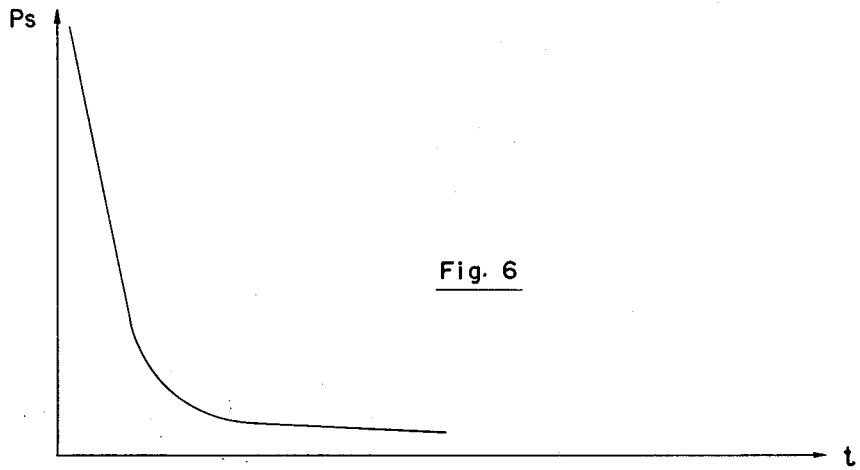
Figs. 6, 7 and 8 are curves illustrating characteristics of process behavior.

The blow down process has a short life, during which the tunnel air flow is supposed to remain fixed, and the discharge is controlled by valve 2, through which critical discharge obtains throughout the useful life of the process. Pressure down stream of the valve therefore has no direct effect on the flow through the valve, and, as Fig. 6 illustrates ($t$ standing for time and $P_s$ for supply pressure), if the valve had a fixed opening the pressure of tank 2 would fall exponentially and the flow through the valve would be proportional to the first power of the pressure up stream of the valve and to the valve opening. However, if some down stream pressure is applied to the controller as an index of flow, the valve will have to open more and more as the up stream pressure drops in order to keep tunnel flow constant. Now, if as the valve opened the pressure decreased linearly proportionally due to change in valve opening, and the valve itself was "linear," performance would be linear.

Obviously, such a phenomenon does not occur in arrangement such as Fig. 1, unless the valve opening rate can catch up to the exponential fall of the pressure. In the arrangement shown it can thus be supposed, that for linear results, controller gain should be relatively low during the steep initial portion of the supply pressure drop and should increase as the slope of the exponential drop of supply pressure attempts to decrease as the tunnel run proceeds. The net effect of varying controller gain in this manner approximates a straight line pressure fall, that is, under critical flow conditions the valve opening increases in linear proportion to pressure decrease, hence the flow remains constant in the tunnel plumbing and the control quality is at an optimum insofar as speed, accuracy and stability are concerned.

On the other hand, if there is a transient disturbance, say, due to a temporary, momentary change in the flow resistance of the tunnel plumbing, and such transient is sensed by the controller, a change in gain is not in order, since the net effect of the transient will be to bodily shift the supply pressure-fall curve, not to vary its slope. Under these circumstances, the gain should not change because it is only change in slope that requires change in gain. However, the reset delay, or equivalent, prevents an immediate change in gain, and therefore the immediate response of the controller is to cycle the process condition, i.e., pressure and hence tunnel flow, in damped oscillations centering about the control point. Except for the delay, the oscillations would be the undesirable asymmetrical variety described before.

Figure 7:
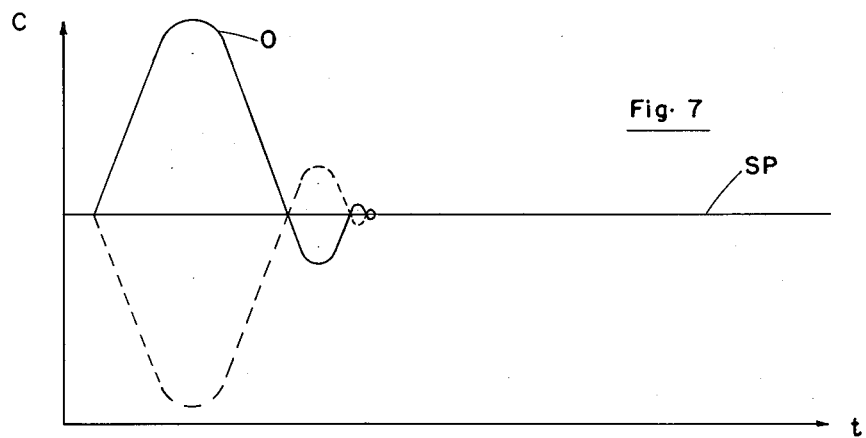
Figure 8:
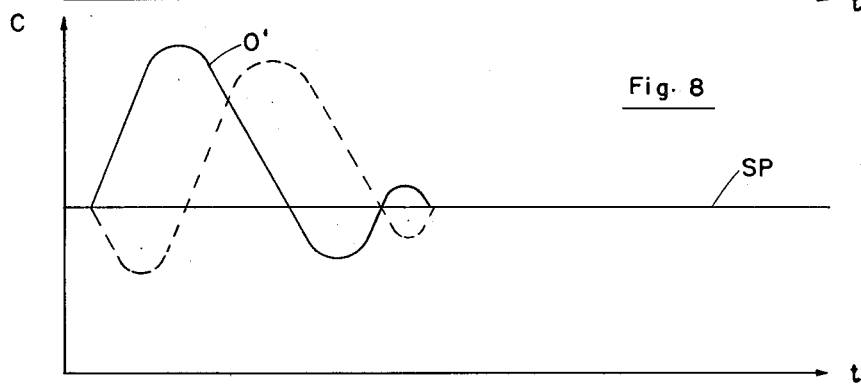

In Fig. 7, where $t$ stands for time, $c$ for the condition being controlled, and the horizontal line SP the desired value of the condition, the damped oscillations is of the desired variety, which may be said to be centered on the line SP, because if the transient causing oscillations O had been of the opposite sense, the oscillations would have been the reflection (dotted line representation in Fig. 7) of the solid line oscillations O. Fig. 8, on the other hand shows the asymmetrical oscillation O', such as typical of the transient response of a prior art characterized system. There the term "asymmetrical" is used since, as illustrated by the dotted line oscillation in Fig. 8, reversing the sense of the transient does not result in response that is a simple reflection of oscillation O'.

While Figs. 6, 7 and 8 show quantitative relations in a general way, they are to be taken as suggestive, not definitive, of actual relationships of wave form, amplitude, etc., to be expected in practice. In any given case, for sufficiently small transients, control results in a system tending to behave as in Fig. 8 will be so little different from the fixed gain system (or a system utilizing my invention) implied by Fig. 7, as to be quite satisfactory. On the other hand, for severe transients, prior art characterization approaches may lead to worse results than those suggested by Fig. 8.

To sum up, at the higher pressures where the exponential pressure fall is great, gain should be low, whereas as the slope of the supply pressure fall curve decreases, gain should be higher since increasingly greater successive opening increments of a linear or equivalent valve will be required to execute equal increments of flow change as the valve proceeds from minimum opening or closed, to maximum opening.

In the case of a pneumatic controller, having proportional and reset response (and, indifferently, perhaps rate response), automatic gain control is obtained by linking some sort of pressure responsive motor device, such as a bellows, diaphragm, or the like, to the gain control, and connecting the motor to the reset pressure of the controller so as to actuate the gain control in accordance with the reset pressure.

The modification involved is very slight, and is without unintended consequence on controller performance, save that the loading effect of the gain control pressure responsive device may cause a slight shift in calibration of the reset-time adjustment, since the prior art controller is not designed with the eventuality in mind of utilizing reset pressure for any other function than reset.

In Fig. 1, the non-linearity causing variable gain and hence necessitating characterization of the control system, is the exponential variation in supply pressure. This, and other process idiosyncrasies calling for characterization may be expressed generally by saying that any process disturbance (excepting transients) resulting in a change in the quantity passed by the valve at a given opening requires a change in gain setting of the control. The quantity may be considered in various terms, e.g., weight, heat and so on. Hence, the blow-down wind tunnel is but one example of the general case, since, other things being equal, the tunnel flow would remain constant except for the variation in the rate of change of supply pressure.

Figure 2:
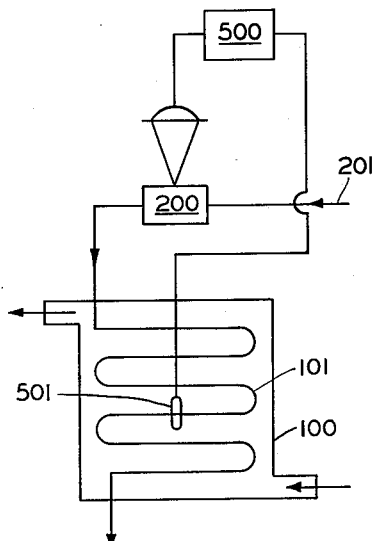

Therefore in Fig. 2, I have illustrated a second example of the general case, which is quite different in its particulars from the blow-down tunnel case, in order to indicate the wide applicability of my invention. In Fig. 2, the reference numeral 100 denotes a tank, at the bottom of which a fluid to be heated by a heating coil 101 is admitted, the heated fluid leaving from the top of the tank, egress and ingress being indicated by appropriate arrows in the figure. A valve 200 controls the flow of steam in a steam line 201 through coil 101, the steam condensing in the coil and transferring its heat to the fluid passing through the tank.

A controller 500 positions valve 200 as a function of the temperature of the fluid transmitted to it by temperature sensing bulb 501 located at any convenient place in the tank wherein there reigns a temperature representative of the heating effect of coil 101.

In a process such as shown in Fig. 2, if the temperature of the fluid entering the tank remains constant, the consumption of fluid remains constant, the steam condenses to a pressure lower than that needed to maintain critical flow through the valve, and the steam supply pressure remains constant, then the process behaves linearly, and, moreover a certain amount of variation in these factors can be tolerated and will permit the use of a linear valve. However, variation in steam supply pressure requires the valve to vary its opening to supply a fixed fluid demand and the resultant process non-linearity may require compensation. Likewise, if the steam is not supplied by critical flow through the valve, variation in condensing pressure will also produce a process non-linearity. In any case, if non-linearity is compensated for, the compensating change in gain follows from temperature changes, and, as in the blow-down tunnel case, it is desirable that the controller distinguish between transients causing a short term temperature change and long term variations of process conditions such as condensing pressure and supply pressure which would result in a non-linear relation between controller operation and temperature unless the expedient of characterization is resorted to.

In contrast to the process of Fig. 1 the process of Fig. 2 has a quite different time scale of events since heat transfer is involved. In a great part this is a matter of much greater system lags in Fig. 2, and response times and reset times will be longer, which implies a need for considerable delay in gain change consistent with the large reset delay implied by a low rate of reset.

The foregoing suggests, that to some extent reset time is a natural measure of the gain change lag necessary, and it is a fact that, if reset time is chosen as a starting point, the smaller the gain change delay, the more the system will behave as a prior art characterized control system, whereas the larger the delay, the more the system will behave as if it is not characterized. Hence, reset delay appears to be in some sense a happy medium. However, I do not believe that reset time is necessarily the best and/or only criterion by which to determine the optimum balance between characterizing and non-characterizing tendencies of a controller according to the invention. Hence, it is not to be considered that the said criterion is a critical limitation of my invention. This last remark has also been implied supra in discussing alternative approaches in Fig. 1 to delayed actuation of the gain control.

Figure 3:
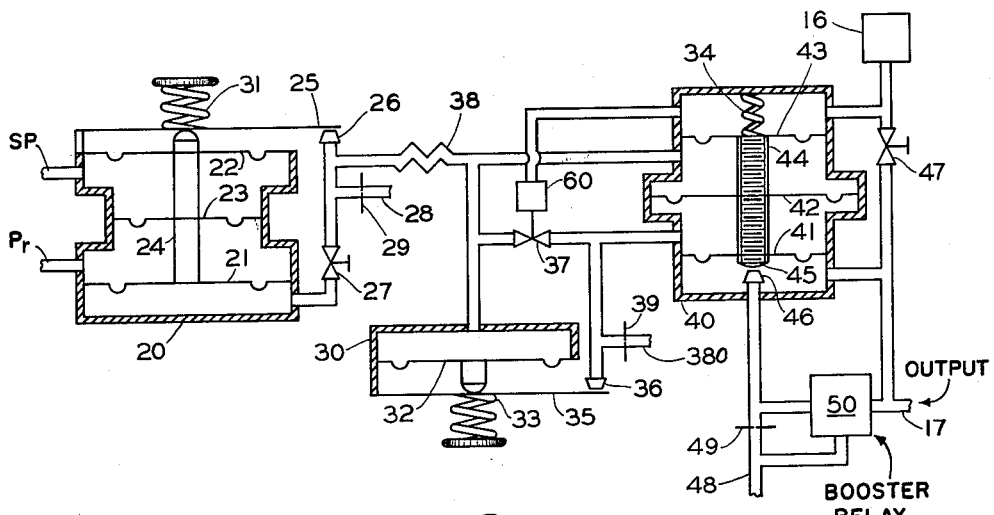
Fig. 3 is a pneumatic circuit diagram of a conventional controller modified according to the invention.
Figure 4:
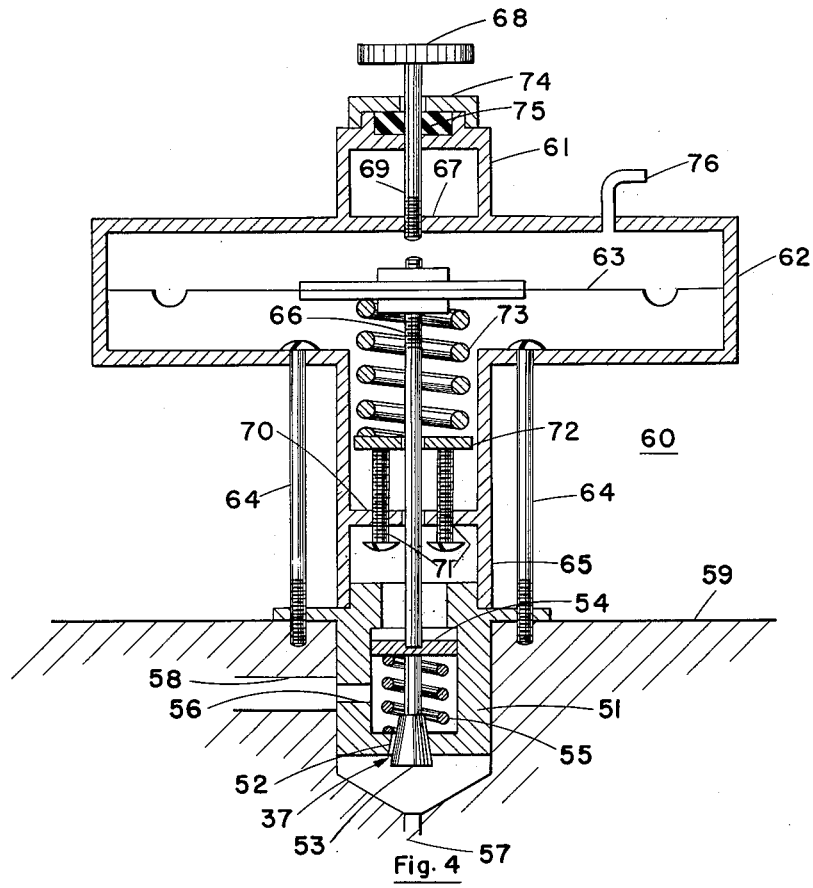
Fig. 4 is a detail of Fig. 3 showing a mechanism for automatically varying controller gain.

Figs. 3 and 4 show in considerable detail the application of the principles of my invention to a typical controller.

In Fig. 3 is shown a conventional controller, in this instance a so-called 335R Tri-Act controller manufactured by the assignee of the present application. While the principles of construction and operation of this type of controller are generally known to those skilled in the art, by way of review, a pair of pressures representing respectively the desired value of a process condition (set point pressure) and the actual value of such condition (process pressure) are admitted to controller stage 20, at SP and Pr, respectively, and are compared by similar diaphragms 21 and 22, separated by diaphragm 23, the three diaphragms being interconnected by stem 24. Depending on whether the process pressure is larger or smaller than set point pressure, net motion of the diaphragms is down or up to bring a baffle 25 nearer to or farther from a nozzle 26. Nozzle 26 is connected to a supply of constant pressure from an orifice 29 and pressure supply line 28, as is usual, and the back pressure of the constant pressure supply is exerted via a so-called Pre-Act or rate valve 27 on the bottom of diaphragm 21. Hence, if baffle 25 approaches nozzle 26, as when set point pressure is lower than process pressure, the back pressure in the nozzle increases and, depending on the resistance to air flow of the Pre-Act valve and the air volume of the controller structure and piping involved in causing nozzle back pressure to exert a force on diaphragm 21, the diaphragms 21, 22 and 23 are sooner or later forced to move up and increase the spacing between nozzle 26 and baffle 25. Controller stage 20 is coupled by an air-flow resistance 38 to a gain relay 30 including a diaphragm 32, baffle 35, nozzle 36, the latter being supplied by a constant pressure source, such as an orifice 39 in a pressure supply line 380.

The back pressure of nozzle 36 is connected to be fed back to the upper side of diaphragm 32 via a so-called gain valve: adjustable flow restrictor 37. A second controller stage 40 is connected to stage 20 also via capillary 38. The back pressure of nozzle 36 is directly connected to stage 40 and is exerted on the upper side of a diaphragm 41 and on the lower side of a larger diaphragm 42. The pressure on top of diaphragm 32 of gain relay 30 is exerted on the upper side of diaphragm 42 and on the under side of diaphragm 43, diaphragm 43 being similar to diaphragm 41. Diaphragms 41, 42 and 43 are connected by a stem 44, the lower end 45 of which serves as a baffle relative to nozzle 46. As in the case of nozzle 26, nozzle 46 is fed by a fixed air supply from an orifice 49 and supply line 48, the pressure of supply line 48 also directly feeding booster relay 50, said relay 50 being responsive to the back pressure of nozzle 46. The booster relay 50 is used simply to increase the output power capacity of stage 40, otherwise the pressure fluid from orifice 49 would be fed directly to the bottom of diaphragm 41 and, via reset valve 47, to the top of diaphragm 43 and to chamber 16. Nozzle 46 would then have to be vented to atmosphere instead of being supplied from orifice 49 and line 48.

While the operation of stage 40 is somewhat complex, in brief, it produces an output at 17 (which will be connected in controller operation to an expansible chamber device such as a valve motor, or the like) depending on the relation of set point pressure to process pressure, on the extent and sense of deviation, if any, of process pressure from set point pressure, on the rate of change of process pressure, and on the duration of any deviation.

Increase in back pressure of nozzle 26 (resuming where description of the operation of stage 20 left off, supra, and assuming gain and reset valves fully closed) will move diaphragm 32 downward to drop the pressure between diaphragm 41 and 42, since baffle 35 moves away from nozzle 36, while the pressure increase of stage 20 increases the pressure between diaphragms 42 and 43. The effect of each inter-diaphragm pressure change is to apply a net downward force on diaphragms 41, 42 and 43, and accordingly stem 44 moves downward to throttle nozzle 46. The resulting increase in the back pressure of nozzle 46 increases the pressure output of booster relay 50, which output produces an upward force on diaphragm 41 to move the end 45 away from nozzle 46. At the same time the pressure exerted on the load connected to output 17 increases.

To provide reset action, valve 47 is opened, and after a certain time, depending on the total volume between valve 47 and diaphragm 43 (including chamber 16) and the flow resistance of valve 47, the events described above with reset and gain valves closed, will be modified, since the pressure output of booster relay 50 after a short delay begins also to be applied to the top of diaphragm 43, which tends to nullify the upward tendency of the relay output as applied to the bottom of diaphragm 41.

With gain valve 37 closed, sensitivity of stage 40 to changes in the output of stage 20 is at maximum, while the lesser the flow resistance of reset valve 47 and the lower the volume between it and the top of diaphragm 43, the more massive, so to speak, is the change in output of relay 50 in response to the increase in output of stage 20, and to the duration of increase of stage 20 output. When gain valve 37 is not fully closed, change in back pressure of nozzle 36 is felt on both sides of diaphragm 42 and the sensitivity of stage 40 then depends on the effect of valve 37 on how the change in back pressure of nozzle 36 acts on the top of diaphragm 42.

Obviously, the lesser the flow resistance of valve 37, and the more alike the volume between the top of diaphragm 42 and nozzle 36 and the volume between the bottom of diaphragm 42 and nozzle 36, the more the output of stage 40 depends on the output of stage 20 without the effect of gain relay 30.

Therefore, to increase the gain of the controller as a whole, the flow resistance of gain valve 37 is increased.

It is unnecessary to go further into the functioning of the controller as thus far described, since that will be entirely clear to those skilled in the art, except to note that springs 31, 33 and 34 are provided for adjustably determining force and position relationships among the various diaphragm devices, as is conventional.

In addition to showing a conventional arrangement of controller elements, Fig. 3 also includes an element 60, connected to gain valve 37 and to a part of stage 40 wherein reigns the reset pressure of the controller, i.e., the pressure effective on the top of diaphragm 43. Element 60 is the automatic gain control mechanism according to the invention and is shown in exemplary detail in Fig. 4.

In Fig. 4, the gain valve 37 is seen to include a hollow cylindrical body 51 having at its lower end an orifice 52 in which the needle 53 is vertically reciprocable to change the flow area of the orifice 52. Needle 53 is urged upwardly by a spring 55 seating at the bottom of the cylindrical bore of body 51 about orifice 52 and on the lower side of plunger 54, said plunger being integral with said needle.

A port 56 in body 51 communicates with a passage 58 in the controller body, generally indicated as the amorphous hatched area 59, with the valve body, as a whole, interfitting with a complementary recess in controller body 59 at the bottom of which recess is a port 57. Hence ports 56 and 57, passage 58, and valve 37 define the path from nozzle 36 to diaphragm 32 via gain valve 37 as shown in Fig. 3. In the particular model of controller involved, Fig. 4 as thus far described, presents no difference as between a controller modified to utilize my invention and an unmodified controller of the same type. The gain valve itself is essentially that set out in more detail in U.S. Letters Patent 2,618,457 to J. R. Davidson, dated November 18, 1952 and assigned to the assignee of the present invention.

In the conventional arrangement, as the Davidson patent shows, a manually operated adjusting screw device threads into or out of the open upper end of valve body 51 to force the piston 54 down or to allow it to come up under the urging of spring 55. According to my invention, such adjusting screw is removed and an automatic gain control actuator 60 is substituted therefor.

Actuator 60 comprises a hollow, generally cylindrical casing 61 having an enlarged portion 62. A movable diaphragm 63, secured in said enlarged portion 62 by any convenient means, hermetically separates the enlarged portion of casing 61 into upper and lower parts.

A pair of screws 64 threading into tapped holes in controller body 59 secure casing 61 to controller body 59, pulling the lower end 65 of casing 61 down against body 59 to hold the entire assembly of gain valve and actuator fixed to the controller.

At the upper end of the casing, a knob 68 terminating in a threaded stem 69 serves to move threaded stem 69 vertically in a tapped hole in a casing partition 67.

Depending from the center of diaphragm 63 is a stem 66 that is in contact at its lower end with the top of plunger 54, passing freely through an apertured casing partition 70 in casing portion 65.

A plurality of screws 71 are threaded through tapped holes in partition 70 so that the upper ends of the screws abut against an annular spring seat 72 surrounding stem 66. Between the bottom of diaphragm 63 and spring seat 72 is compressed spring 73. Hence, if the ends of screws 72 are caused to move up, compression in springs 55 and 73 cause plunger 54, needle 53, stem 66, etc. to follow until or unless the diaphragm assembly moves so far as to be abutted by the lower end of stem 69.

The casing above diaphragm 63 is sealed by passing stem 69 through a stuffing box comprising packing 75 and a nut 74 for compressing the packing about the stem, and a connector 76 is provided for connecting the casing space above the diaphragm to a source of pressure, for example, to reset pressure as in Fig. 3. The casing space below the diaphragm is normally open to the atmosphere, although as will be evident from the Davidson patent, suitable sealing precautions should be taken with valve body 51, and plunger 54, to confine the effective flow path to that defined by ports 56 and 57, passage 58 and orifice 52, and to prevent leakage between said path and the ambient atmosphere about the controller body.

In use, the elevation of the upper ends of screws 71 determines one extreme of gain setting: as the screw ends move up, their movement is transmitted through spring 73 to lift stem 66, needle 53 following the stem 66. Hence, in adjusting for minimum gain, screws 71 are adjusted until the maximum pressure expected on diaphragm 63 will balance the forces of springs 55 and 73 with valve 37 open to an extent corresponding to minimum gain.

Conversely, the position of stem 69 determines the maximum gain, which occurs when pressure on top of diaphragm 63 is at a minimum, hence knob 68 is turned one way or another to position the lower end of stem 69 at the correct height corresponding to the maximum gain required.

The gain control mechanism of Fig. 4 will, of course, give increasing gain with decreasing controller output. However, the relation of gain change to valve position change also depends on whether the controller is direct acting or reverse acting, on whether the valve positioner, if used, is direct or reverse acting, and on whether the valve is air-to-open or air-to-close. If it were desired to make gain increase with controller output increase, the lower side of diaphragm 63 could be pressurized instead of the upper side. At the same time, a compression spring would be interposed between the end of stem 69 and the diaphragm, whereas spring 73 would be removed and screws 71 lengthened; accordingly the gain determining roles of stem 69 and screws 71 would be reversed as regards the gain control device of Fig. 4 as shown.

Insofar as Fig. 1 is concerned, the automatic gain control mechanism shown in Fig. 4, is arranged to be used with a controller whose output decreases as the control valve 2 opens and a valve positioner whose output increases to open the valve, hence the valve would be an air-to-open type or equivalent.

Fig. 4 is susceptible to numerous practical refinements such as making spring 73, diaphragm 63 and screws 64 more accessible, so as to allow the possibility of substituting diaphragms and/or springs of different force deflection characteristics, quick removal of the casing 62 from the controller, and so on.

Those skilled in the art realize that any given automatic gain control will have an inherent stroke vs. pressure characteristic determined by spring and diaphragm characteristics. Likewise, the gain valve or equivalent will have an inherent stroke-gain change characteristic. Ideally, the pressure vs. gain characteristic should vary according to the non-linearity being compensated for, but in opposite sense. Where controller gain is changed by varying a restriction, this result is more or less closely approximated due to the non-linearity of the relation between pressure drop across the restriction and the extent to which the restriction is open. However, exactness of characterization is not the concern of this application, nor is it essential insofar as is concerned obtaining the desired transient response of a controller according to my invention.

These and other expedients (such as reversing the taper of needle 53 and orifice 52) for obtaining a particular relation of gain change to controller output pressure change will be obvious to those skilled in the art from my disclosure and the device of Fig. 4 is but one of many structural forms that might be used to control the gain. For example, with a gain valve of the screw-down type, a Bourdon tube might be used to screw the gain valve needle in and out as required.

Figure 5:
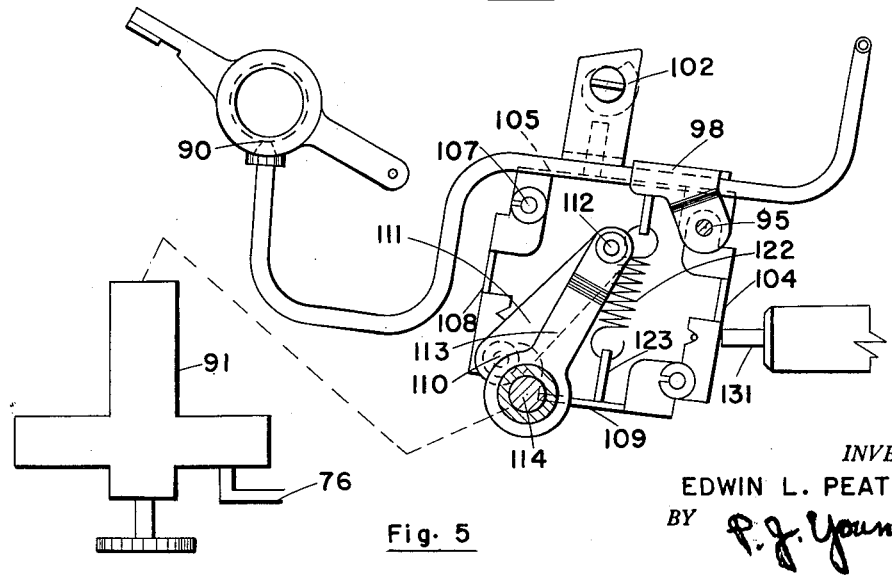
Fig. 5 is a detail of the sensitivity adjusting mechanism of a second type of controller modified according to the invention.

In line with the foregoing, not all controllers utilize an adjustable restrictor for gain adjustment. For example, in U.S. Letters Patent 2,361,885 to K. L. Tate et al., dated Oct. 31, 1944 and assigned to the assignee of the present application, is disclosed a controller wherein the controller output is fed back to cause a nozzle to follow a baffle. The baffle moves relative to the nozzle initially to change controller output. Fig. 5 shows fragmentarily a portion of the so-called parallelogram linkage of the controller of the Tate et al. patent modified to be adjusted automatically by a pressure response device analogous to that utilized in the gain control device of Fig. 4 described above.

Fig. 5 is identical to Fig. 15 of the Tate et al. patent save for the elimination of reference numerals referring to the baffle and nozzle, which have been replaced by the reference numeral 90 indicating baffle and nozzle as a whole, and the addition of automatic gain control device 91. Hence, all that need be said here, is that instead of providing a manual adjusting mechanism to rotate shaft 114, the shaft, according to my invention will be operated by device 91 as by some motion translating device such as a rack and pinion, indicated generally by a dotted-line interconnection of device 91 and shaft 114. Device 91, of course will be a pressure responsive motor arranged according to the principles described supra to increase and decrease controller gain by deflecting the pivot pin 110 of the baffle mechanism. Reference is to be had to the Tate et al. patent for a detailed description of the parallelogram linkage of the patent and its operation.

Given the notion of delayed variable gain which I have described herein, one skilled in the art will be able as a matter of routine design to modify any given type of conventional controller having a manual gain adjustment, so as to obtain a controller having the delayed variable gain characteristic of my invention.

In the foregoing I have disclosed a characterizing expedient of general utility and have indicated a wide range of applicability therefor. While my detailed description has focused on pneumatic mechanism, it is obvious that the essence of the invention is the same, whether the gain control is had by variation of an air flow resistance or by an electric current resistance. It is equally obvious that the exact nature of the device utilized to convert the reset function or equivalent of the controller to a change in gain depends on he type of energy represented by said reset function and the effect into which the reset energy must be converted to produce a change in gain. For example, movement of the tap of a variable electrical resistance might require something in the nature of a galvanometer or other electric motor if the reset function is in the form of electrical energy.

Again, I have used the term "controller" in the claims, and unless indicated otherwise the term is intended to cover the gamut of existing controllers, from those of the simplest wherein the output is a simple function of the process variable, pure proportional, for example, to the most complex types, wherein, for example, the controller output may be a function of process variable, its deviation, the time integral of deviation, the rate of change of deviation, etc.

I claim:

1. In a controller of the type wherein a change in an input signal applied to said controller is converted by said controller into a change in an output signal produced by said controller, said controller having a gain control operable to vary the relation between the magnitudes of said changes, and said controller having means effectively responsive to the magnitude of said output signal for operating said gain control as a function of the magnitude of said output signal, the improvement comprising delay means adapted to delay the effect of a change in output signal on the operation of said gain control.

2. The invention of claim 1 wherein the said delay means produces a fluid pressure the magnitude of which is a function of the said output signal, the said delay means including fluid impedance means through which said pressure is transmitted to utilization means, and utilization means comprising a fluid pressure responsive motor device arranged to operate said gain control as a function of the pressure transmitted through said fluid impedance means.

3. A proportional plus reset controller wherein the output signal of the controller is fed back to the controller to oppose change in said output signal due to change in an input signal applied to said controller so as to provide proportional response, and is also fed back to the controller to aid change in output signal due to change in input signal so as to provide reset response, there being delay means delaying the described aiding feedback, said controller including a gain control means operable to vary the amount of feedback opposing said change in output signal, and means arranged to operate said gain control means in response to said aiding feedback delayed.

4. The invention of claim 3, wherein the controller is energized by a source of fluid pressure, so that controller output signal is a fluid pressure fed back to the controller through a fluid impedance to delay the effect of aiding feedback on controller gain when change in output pressure occurs in response to input signal change, and the said gain control means is a pressure operated device connected to be operated by the pressure output signal after it has been transmitted through said fluid impedance means.

5. In combination with a controller having a controller gain adjusting mechanism and means effectively responsive to controller output to change the gain of the controller as a function of said output, the improvement wherein said means comprises a movable member, abutment means defining one extreme of movement of said member and positioned in the path of movement of said member to fix the value of said one extreme, further abutment means defining a second extreme of movement of said member and positioned in the path of movement of said member to fix said second extreme, said movable member being linked to said gain adjusting mechanism for operation of said mechanism and being effectively responsive to said controller output to operate said mechanism over a range of gain adjustment corresponding to the path of movement of said member, whereby the positions of said abutment means fix the extremes of said range of gain adjustment.

6. The invention of claim 5 wherein at least one of said abutment means is adapted to be adjustably fixed in any of a plurality of positions along the said path of movement of said member.

7. The invention of claim 5 wherein the said movable member is delayedly responsive to a change in controller output, whereby, although controller gain is generally in correspondence with controller output, controller gain remains temporarily fixed at the beginning of a change in controller output.

8. The invention of claim 5 wherein the said movable member is a motor device effectively responsive to controller output to establish positions corresponding to said output.

9. The invention of claim 8 wherein the said motor device is a pressure responsive device and said controller is adapted to produce an output in terms of pressure.

10. The method of controlling a process wherein the behavior of the process depends on the flow of a fluid under control of a valve, and process conditions are such that the actual behavior of the process deviates non-linearly from a desired state of behavior due to non-linear phenomena having an enduring effect on said state of behavior, and also deviates from said desired state of behavior due to transient disturbances having substantially no enduring effect on the desired state of process behavior, said method comprising, measuring the deviation of said actual behavior from said desired state of behavior so as to determine the extent to which the valve must be opened or closed in order to provide a change in flow of said fluid sufficient to restore the process to the desired state of behavior, initially changing the valve opening an amount that is substantially a linear function of said deviation and of a sense opposite to the sense of said deviation, waiting a predetermined interval, and, if the deviation persists, further changing the valve opening by an amount corresponding to the difference between the initial change in valve opening and the change in valve opening required to correct said deviation where said deviation is non-linear, whereas if the afore-mentioned waiting interval indicates that the deviation is due to a transient disturbance, instead of further changing valve opening as aforesaid, restoring valve opening to an amount taking into account only the desired state of behavior of the process and not substantially influenced by the occurrence of such transient disturbance.

11. In a method of process control, wherein an automatic controller of adjustable gain operates a control valve to supply fluid to a process at a rate corresponding to the demand of the process for said fluid, and process conditions are such that satisfaction of the demand requires that different openings of the valve are required in order to provide the same rate of flow, whereby a non-linear effect arises that must be compensated for in controlling the process, said method including utilizing an effectively linear control valve and a substantially linear controller for operating the said linear control valve so as to change the valve opening, and adjusting the gain of the controller so as to cause said linear control valve to have a non-linear operating characteristic compensating for the said non-linear effect, the improvement comprising refraining temporarily from changing controller gain for a predetermined time interval following a change in valve opening apparently calling for a change in gain, but subsequently changing the gain substantially only if a change in gain is still in order, whereby transient disturbances in process behavior corresponding to said time interval and to a change of valve opening other than that change in valve opening that might be demanded by the process in the absence of said transient disturbances, are substantially ineffective to change controller gain.

12. In a controller having a pressure chamber in combination with means adapted to act on the deviation of a process variable from a predetermined value so as to cause an output pressure to appear in said pressure chamber, said controller including gain control means for adjusting the relation between said output pressure and said deviation, and including means for damping said output pressure before it appears in said pressure chamber, pressure responsive means connected to said pressure chamber, said pressure responsive means being operably connected to said gain control means, and said pressure responsive means being constructed and arranged to operate said gain control means in accordance with the magnitude of the pressure in said pressure chamber.

13. The invention of claim 12 wherein said gain control means includes a movable member, said controller being so constructed and arranged that the gain thereof is a function of the position of said movable member, said pressure responsive means includes a movable part, the position of which is a function of said pressure in said pressure chamber, and means connecting said movable member and said movable part, the last said means being so constructed and arranged that movement of said movable part results in movement of said movable member to positions corresponding to said pressure in said pressure chamber.

14. The invention of claim 12 wherein said pressure responsive means includes a second pressure chamber and a movable wall arranged in said second pressure chamber so as to be movable in response to pressure changes in said second pressure chamber for operating said gain control means in accordance with the motion of said movable wall; a rigid stop arranged to limit movement of said movable wall in one direction, spring means biasing said movable wall to move in said one direction, and means for adjusting the bias of said spring means, and means for conducting pressure from the first said chamber to said second pressure chamber for moving said wall as a function of the pressure in said second pressure chamber and of the bias of said spring means.

15. The invention of claim 12 wherein said controller is of the reset type, said pressure chamber is a reset pressure chamber having a pressure connection to said controller output pressure, and there being fluid flow delay means in said connection for causing said controller output pressure to be damped and to appear in said reset pressure chamber with reset characteristics.

References Cited in the file of this patent

UNITED STATES PATENTS

| | | |
|---|---|---|
| 2,340,489 | Pontius | Feb. 1, 1944 |
| 2,586,637 | Fitch | Feb. 19, 1952 |
| 2,638,911 | Griswold et al. | May 19, 1953 |
| 2,638,922 | Caldwell | May 19, 1953 |
| 2,675,819 | Eckman | Apr. 20, 1954 |
| 2,755,813 | Farrington | July 24, 1956 |
| 2,767,725 | Long | Oct. 23, 1956 |
| 2,774,367 | Grogan | Dec. 18, 1956 |
| 2,776,670 | Hunt | Jan. 8, 1957 |
| 2,834,363 | Pessen | May 13, 1958 |
| 2,840,096 | Du Bois | June 24, 1958 |
| 2,878,825 | Grogan et al. | Mar. 24, 1959 |
| 2,888,941 | Grogan | June 2, 1959 |

FOREIGN PATENTS

| | | |
|---|---|---|
| 784,506 | Great Britain | Oct. 9, 1957 |